Feb. 11, 1941.                J. J. WHARAM                2,231,740
                      TRANSMISSION SHIFTING DEVICE
                         Filed Dec. 8, 1939         2 Sheets-Sheet 1
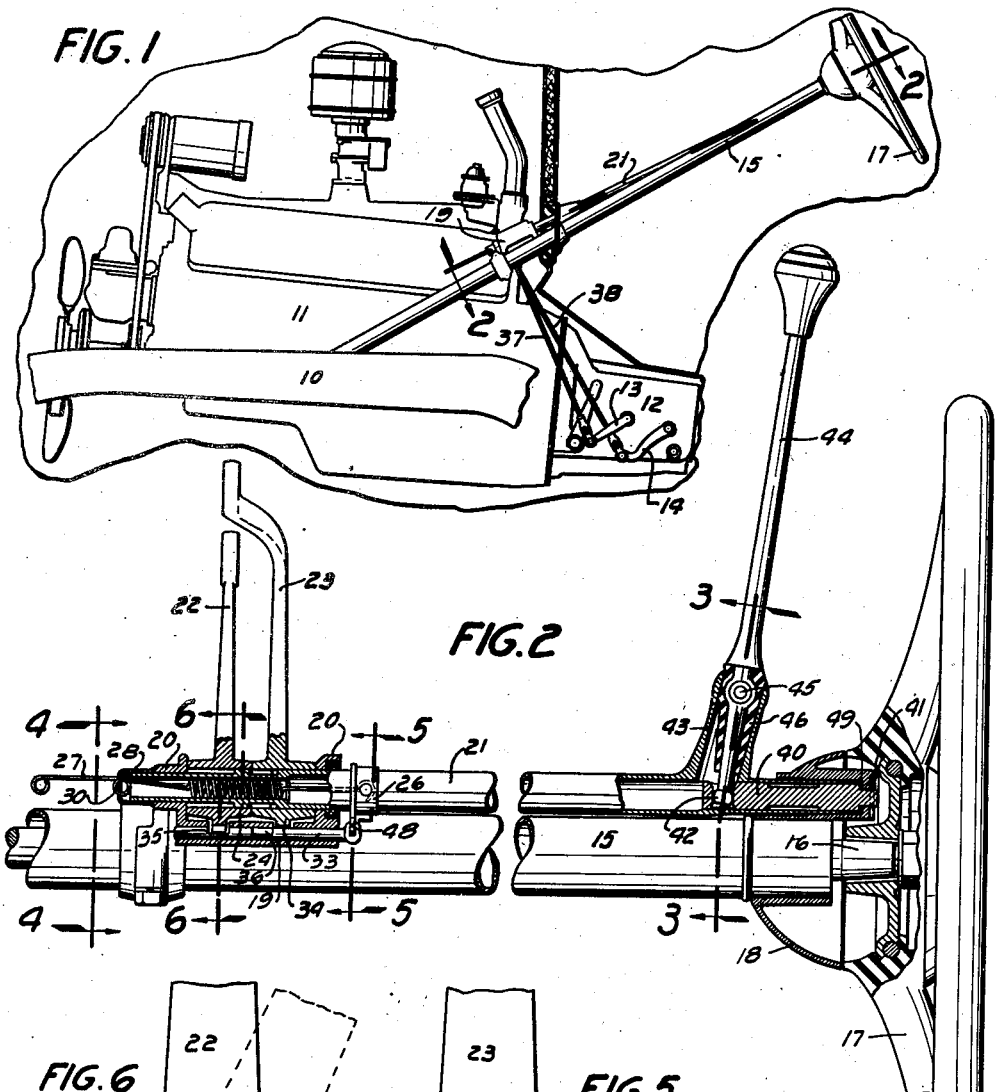
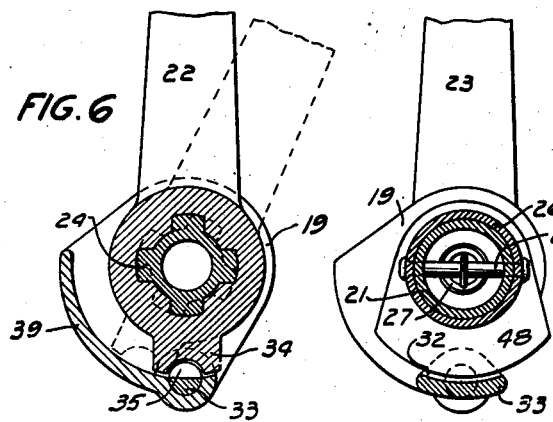
INVENTOR
J. J. Wharam
BY
ATTORNEYS.

Feb. 11, 1941.  J. J. WHARAM  2,231,740
TRANSMISSION SHIFTING DEVICE
Filed Dec. 8, 1939  2 Sheets-Sheet 2

WITNESS
E. Witzke

INVENTOR
J. J. Wharam
BY E. C. McRae
E. L. Davis
ATTORNEYS.

Patented Feb. 11, 1941

2,231,740

UNITED STATES PATENT OFFICE 2,231,740

TRANSMISSION SHIFTING DEVICE

John J. Wharam, Dearborn, Mich., assignor to Ford Motor Company, Dearborn, Mich., a corporation of Delaware Application December 8, 1939, Serial No. 308,142

5 Claims. (Cl. 74—484)

The object of my invention is to provide a transmission shifting device especially adapted for use in connection with motor vehicles.

A further object of my invention is to provide a transmission shifting device of the type known as steering column gear shift wherein the lever for shifting the transmission gears is secured to the steering column of the vehicle just beneath the steering wheel. My invention relates to improvements in this type of shift mechanism, as it is conceded that the general arrangement of such mechanism is old. My improvements relate to simplified means for assembling the device, means for insuring more positive operation of the device under all conditions, and means for reducing the mechanical effort required to shift the transmission gears.

Many of such shifting devices have been made in the past but each design has been objectionable for one reason or another. In most of these designs, considerable play or backlash was unavoidable when the device was built upon a production basis and this resulted in a very poor feel in the operation of the device. In my improved design, backlash is almost entirely eliminated so that the operator may readily feel when the gears are engaging. Furthermore, because of a novel fulcrum arrangement for the shift lever, I have practically eliminated friction at this point so that much easier operation results.

Still further, in my improved design the several parts may be readily assembled on the car without the use of special tools to produce a neat appearing structure in which no screws, bolts or other fastening devices are visible from the driver's seat.

The transmission, per se, with which my shifter is to be used is provided with a pair of shifter bars in the conventional manner, which bars are adapted to be moved fore and aft, respectively, to engage two different speed ratios in the transmission. Reciprocation of one bar controls the low and reverse speeds while reciprocation of the other controls the second and high speeds. Suitable interlocking means is provided so that one bar may not be shifted when the other is in any but a neutral position.

In the past it has been customary to connect these bars with links and levers which extend to position beneath the steering wheel and to provide a shift lever adjacent to the wheel which selectively engages these levers to thereby move the desired shifter bar in the transmission. This construction has the disadvantage that when the transmission is in neutral position an attendant in servicing the car from within the engine compartment or beneath the car, may accidentally move one of the links or levers to thereby engage one speed in the transmission. This operation will not, of course, move the steering gear lever because in neutral it is connected to neither shift bar. When this occurs the operator is unable to shift the transmission back to a neutral position or to drive the car in any speed but that in which it has been placed. In other words, the shifting mechanism will be entirely useless. Such accidental occurrence can readily be remedied by manually moving the shift bar to its neutral position from beneath the car but in many cases much inconvenience is caused because the driver is unaware of what is wrong and because the steering wheel shifting device is useless. It is therefore the object of this invention to provide a shifting mechanism which cannot be so dislocated by an attendant or by other accidental means to thereby improve the performance of the vehicle.

With these and other objects in view, my invention consists in the arrangement, construction and combination of the various parts of my improved device, as described in this specification, claimed in my claims, and illustrated in the accompanying drawings, in which:

Figure 1 is a side elevation of an automobile engine, transmission, and steering post, with my improved transmission shifting device installed thereon.

Figure 2 is a sectional view, taken upon the line 2—2 of Figure 1.

Figure 5 is a sectional view, taken upon the line 5—5 of Figure 2, and

Figure 6 is a sectional view, taken upon the line 6—6 of Figure 2.

Figures 3, 4:
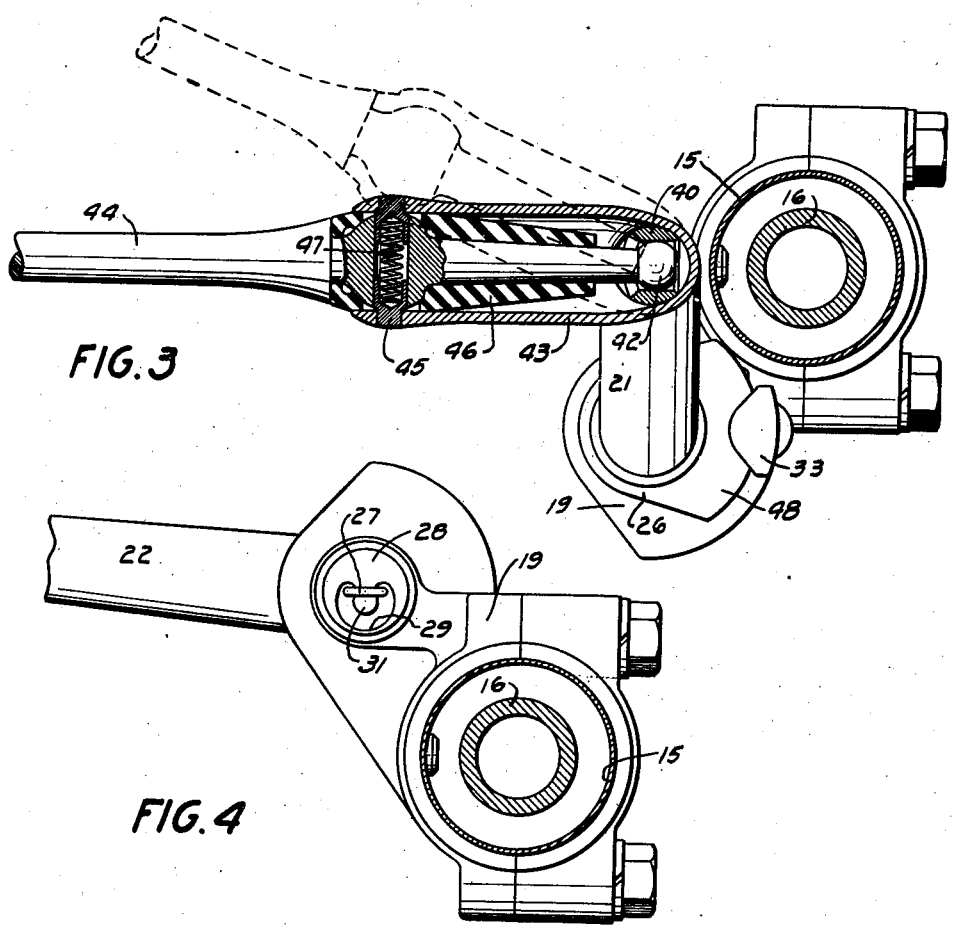
Figure 3 is a sectional view, taken upon the line 3—3 of Figure 2.
Figure 4 is a sectional view, taken upon the line 4—4 of Figure 2.

Referring to the accompanying drawings, I have used the reference numeral 10 to indicate the frame of a motor vehicle, in which a conventional internal combustion engine 11 is secured. A sliding gear transmission 12 is secured to the rear end of the engine 11 in the conventional manner, this transmission being provided with the necessary gears, clutches, etc., to effect low, intermediate and direct speeds forward and one speed in reverse. The transmission 12 is provided with a pair of cross shafts extending therethrough which are connected with suitable shifting bars inside of the transmission to effect the various speed ratios. An arm 13 is fixed to one of these shafts and projects outwardly from the transmission so that rotation of this arm in each direction from a neutral position effects the second and high gear ratios in the transmission. A second arm 14 is fixed to the other of said shafts and movement of this arm fore and aft produces the low and reverse speeds in the transmission.

The transmission itself has not been illustrated in detail as it forms no part of this invention and because nearly any of the conventional transmissions may be substituted without affecting the operation to any material degree.

A steering column 15 is fixed to the frame 10 and extends upwardly and rearwardly where its upper end is fixed to the vehicle body in a stationary position. A steering gear housing is fixed to the bottom end of the column 15 at the point where it is fastened to the frame 10 and a shaft 16 is rotatably mounted within the steering column 15. A steering wheel 17 is secured to the upper end of the shaft and its lower end is connected to the steering gear.

It will be noted that a semispherical flange 18 is fixed to the upper end of the column 15, which flange coacts with a correspondingly shaped hub portion of the steering wheel 17 to form a chamber therebetween.

Before describing in detail the construction employed for shifting the transmission, it may be well to mention that a control lever is mounted just beneath the steering wheel which is connected to a single shaft which extends substantially parallel to the steering column in such a manner that arcuate movement of the control lever in the plane of the steering wheel simply oscillates the aforementioned shaft while movement of the lever in an up and down direction reciprocates the shaft axially. Thus only one shaft extends from the steering wheel down through the floorboards of the car to provide a neat appearing construction. A pair of arms are pivotally mounted at the lower end of the steering column which is connected to the arms 13 and 14, respectively, and suitable mechanism is provided for selectively oscillating either of these last two mentioned arms by the shift lever while it is either in its upper or lower positions.

In the detailed construction used a bracket 19 is clamped on the intermediate portion of the steering column 15, which bracket is provided with a pair of axially spaced bearing supports 20 thereon. These supports each have an opening therein through which a tubular control shaft 21 extends. The shaft 21 is both reciprocally and rotatably mounted in these openings. The shaft 21 extends upwardly alongside of the steering column 15 and its upper end is similarly mounted in suitable openings in the flange 18.

Referring to Figure 2 it will be noted that arms 22 and 23 are mounted upon the shaft 21 between the supports 20. As shown in Figure 6, the bore in each of these arms 22 and 23 is splined, and the adjacent portion of the shaft 21 is correspondingly splined at 24 to engage these splined portions. However, the splines on the shaft 21 are only long enough so that when the shaft 21 is in its downward position, the splines will engage only the arm 22 and when the shaft 21 is in its upper position then the splines will engage only the shaft 23. While the shaft is moving from one of these engaged positions to the other, the splines 24 connect both of the arms together and to the shaft.

From Figure 5, it will be noted that a pin 25 extends through tube 21 and is adapted to hold a collar 26 upon the tube just above the bracket 19. The pin 25 also serves as an anchor for a tension spring 27 which extends downwardly therefrom and is anchored at the bottom end of the bracket 19. A cup-shaped member 28 extends over the bottom end of the tube 21 and is provided with a U-shaped opening 29 in its bottom portion. The spring 27 is provided with a convolution 30 intermediate of its end which may be hooked over a tongue 31 formed by the U-shaped opening to thus anchor the spring in place.

From the foregoing it will be seen that after the tube 21 has been installed in position the spring 27 may be inserted through the bottom end of the tube and hooked over the pin 25. The spring may then be stretched downwardly and the convolution 30 hooked over the tongue 31 to thereby resiliently urge the tube 21 downwardly at all times.

The collar 26 is provided with a flange 48 which extends radially therefrom, the periphery of which engages a slot 32 which is formed in the upper end of an interlocking pin 33. The pin 33 is reciprocally mounted in the bracket 19 in a position parallel to the shaft 21. Each of the arms 22 and 23 is provided with interlocking lugs 34 which extend from their hub members in a direction opposite to the arms. The bracket 19 is notched out to receive the lugs 34 and suitable slots 35 and 36 are formed in pin 33 to permit the arms to oscillate one at a time, according to its position. When the pin is in the position shown in Figure 2, the slot 35 is aligned with the lug 34 on the arm 22 so that the arm may freely oscillate. The only time that the pin 33 is in this position is when the tube 21 is in its lowermost position and, of course, at this time the spline 24 engages the splines in the arm 22 to thereby positively connect the arm 22 and the tube 21. If now the tube 21 is moved upwardly, then the slot 36 in the pin 33 becomes aligned with the lug 34 on the arm 23 so that this arm may be oscillated by the shaft 21. The lower portion of the pin 33 at this time engages with the lug 34 on the arm 22 to thereby prevent oscillation of this arm while the shaft 21 is in its upper position.

From the foregoing it will be seen that when the tube 21 is connected to either one of the arms 22 or 23 by means of the splines 24, that the arm to which it is connected is free to oscillate with the tube and that the other arm is positively held against oscillation in either direction. This is very important because it prevents the arm which is at the time disconnected from the tube 21 from being accidentally moved to one of its engaged positions. A link 37 connects the arms 22 and 13 and another link 38 connects the arms 23 and 14.

When the shift is in neutral position the tube 21 is urged downwardly by the tension spring 27, so that the arm 22 will be connected thereto for rotary movement. The link 37 connects the arm 22 to the transmission shifter. In this position the arm 23 will be connected by the link 37 with the arm 14 but the transmission, being in neutral, permits the oscillation of the arm 14. The interlocking mechanism in the transmission permits oscillation of either arm providing the other is in the neutral position. If now the arm 14 is accidentally moved in either direction, the arm 23, were it not for the pin 33, would be free to follow this movement. If such movement were permitted it would then be possible to move the splines 24 upwardly because they would not be aligned with the splines in the arm 23. The tube 21 could not be rotated to a position where it would mesh with the splines in the arm 23 because the arm 14 being in an engaged position prevents movement of the arm 13 by the transmission interlocking mechanism. Thus, the operator would be prevented from either moving the shaft 21 upwardly or from rotating same. This could be corrected only by manually moving the arm 14 to the neutral position from beneath the car. With my improved construction this happening is prevented because when either arm is connected to the tube 21 the other of these arms is at this time held from rotation.

It will be noted from Figure 6 that an arcuate shield 39 is cast integrally with the bracket 19 so that stones or the like thrown up from the road cannot lodge between the lugs 34 and the pin 33.

Referring to the right-hand portion of Figure 2 it will be noted that an anchor plug 40 is loosely inserted in the upper end of the tube 21. The upper end of this plug is reduced in diameter and extends through a suitable opening in the flange 18. This end is slotted to receive a U-shaped washer 41 and the adjacent portion of the flange 18 is countersunk so that the washer may be inserted and then, with the plug 40, moved downwardly into the countersunk seat in the flange. As long as the plug 40 is urged downwardly the washer will be held in this position. The lower end of the plug 40 is provided with an opening therethrough in which a ball end 42 of a shift lever 44 is mounted for oscillation in all directions. A sleeve 43 extends radially from the tube 41 adjacent to the lower end of the plug 40 and is adapted to pivotally support the shift lever 44.

From Figure 3 it will be noted that the intermediate portion of the lever 44 is provided with a transverse opening therethrough in which a pair of spring urged detents 45 are reciprocally mounted. These detents are urged outwardly by a spring 47 into suitable aligned openings in the outer end of the sleeve 43 to thus pivotally support the lever 44 in the sleeve. A flexible rubber tube 46 is stretched over the enclosed end of the lever 44 to close the space between the enlarged center portion of the lever and the end of the sleeve 43. This tube also extends along the inner end of the lever 44 and functions to eliminate any rattle which might otherwise develop between the lever 44 and the sleeve 43.

When the operator desires to engage the low or reverse speeds in the transmission he first pulls up upon the outer end of the lever 44 which raises the tube 21 around the stationary anchor plug 40. This engages the splines 24 with the arm 23. In the normal operation of the car, the lever 44 is first moved upwardly and then rotated clockwise to the low speed position. When it is desired to engage the second speed the lever is simply rotated counterclockwise, the first portion of this movement bringing the arm 23 to its neutral position where the spring 27 pulls the tube 21 downwardly into engagement with the arm 22 so that upon continued counterclockwise movement, the splines 24 rotate the arm 22 to engage the second speed gear. The direct drive is then engaged by moving the lever in a clockwise direction. The spring 27 at this time ensures that the splines 24 remain engaged with the arm 22.

It will be noted from Figure 2 that a spring washer 49 is interposed between the top of the plug 40 and the flange 18 which resiliently urges the plug 40 downwardly to thus urge the washer 41 into its socket. This prevents the accidental detachment of the washer 41 when the device is being assembled.

One method of assembling my improved device is to install the shift lever 44 and the anchor plug 40 in the upper end of the tube 21 and then assemble the tube to the bracket 19 with the pin 33 and arms 22 and 23 in position. This unit is then placed alongside of the steering column and its upper end inserted into the flange 18 with the washer 49 therebetween. The washer 41 is then installed in the upper end of the plug 40 and the bracket 19 fastened to the column. The spring 27 is then hooked over the pin 25 and tensioned to its normal position.

However, if desired the plug 40, may be assembled in the flange 18 by means of the washers 49 and 41 and then the tube 21 inserted into position. The lever 44 may then be attached, and the bracket 19 still later fastened to the lower end of the tube. The levers 22 and 23 should, of course, be assembled on the tube 21 when the bracket 19 is being installed.

After the parts have been assembled to the steering column the arm 22 is placed in a neutral position and the link 37 is connected to the transmission arm 13. The shifter lever 44 is then pressed downwardly which connects the arm 23 with the spline 24 and the link 38 is then installed to connect the arms 14 and 23. This sequence of operations is mentioned because the links 37 and 38 are adjustable for length and in this way the correct lengths are readily determined.

Among the many advantages arising from my improved construction, it should be noted that the shift lever is so mounted in the sleeve 43 that no exposed nuts or bolts are present. If it is desired for any reason to remove the lever 44, the detents 45 may be simultaneously pressed inwardly so that the lever may then be pulled outwardly from the sleeve.

Still a further advantage of my improved construction arises because the low and reverse speed arm cannot accidentally be moved when the transmission is in a neutral position, as sometimes happens with many types of steering column gearshifting mechanisms.

Some changes may be made in the arrangement, construction and combination of the various parts of my improved device without departing from the spirit of my invention and it is my intention to cover by my claims such changes as may reasonably be included within the scope thereof.

I claim as my invention:

1. In a steering column gearshift mechanism for motor vehicles comprising, a shaft mounted upon said steering column for both reciprocal and rotatable movement relative thereto, a pair of arms rotatably mounted upon said steering column, said arms being held against axial movement, links connecting said arms with the vehicle transmission so that oscillation of each arm in each direction engages a particular gear train in the transmission, chutches formed on each of said arms and upon said shaft, said clutches upon reciprocation of said shaft engaging either one or the other of said arms for rotation with said shaft, an interlocking lug formed upon each of said arms, a pin reciprocally mounted in said bracket, means associated with said shaft for reciprocating said pin therewith, said pin having a plurality of notches formed therein which in one extreme reciprocating position of said shaft engages the interlocking lug in one of said arms to prevent rotation thereof when said clutch means engages the other of said arms for rotation with said shaft, and means associated with the upper end of said steering column for reciprocating and rotating said shaft.

2. A gearshift mechanism for motor vehicles comprising, a bracket secured to the steering column of said vehicle intermediate of its ends, a flange formed on said column at its upper end, a shaft reciprocally and rotatably mounted in suitable bearings in said bracket and flange, respectively, a pair of arms rotatably mounted upon said bracket, a clutch formed on each of said arms, said arms being prevented from axial movement relative to the steering column by means of said bracket, links connecting said arms with the vehicle transmission so that oscillation of each arm in each direction engages a particular gear train in said transmission, clutch means formed on the lower end of said shaft which upon reciprocation thereof engages the clutches on one or the other of said arms, an interlocking pin reciprocally mounted in said bracket substantially parallel to said shaft, a collar associated with said shaft which engages a suitable slot in said pin so that said pin is caused to reciprocate with said shaft, interlocking lugs formed on each of said arms, said pin having a plurality of notches therein which when said shaft engages one of said arms permits rotation of said arm and interlocks with the lug of the other arm to prevent rotation thereof, and means associated with the upper end of said steering column for reciprocating and rotating said shaft.

3. A gearshift mechanism comprising, a shaft rotatably and reciprocally mounted upon the steering column of said vehicle in substantial axial alignment therewith, means associated with the lower end of said shaft which upon oscillation of the shaft at each end of its reciprocal stroke selectively engages a particular gear train in the transmission, a sleeve extending laterally from the upper portion of said shaft, said shaft at its upper end being tubular, an anchor plug inserted in the upper end of said shaft, the upper end of said plug being fixed to the steering column and its lowermost end having an opening therein in substantial alignment with said sleeve, a shift lever having an enlarged intermediate portion disposed within said sleeve with said enlarged intermediate portion thereof in substantial alignment with the outer end of said sleeve, the enlarged portion of said shift lever having an opening therethrough, smaller openings in the outer end of said sleeve in alignment with the shift lever opening, and a pair of detents disposed within the opening in said shift lever, said detents having reduced end portions which enter the smaller openings in said sleeve, and a compression spring disposed between said detents so that when said shift lever is inserted into said sleeve said detents will be urged outwardly into said sleeve openings and thereby pivotally support said shift lever in said sleeve, and a resilient rubber member disposed between said shift lever and said sleeve, for the purpose described.

4. A steering column gearshift mechanism comprising, a tubular shaft pivotally and rotatably mounted upon suitable bearings associated with said steering column, said shaft having means associated with its lower end whereby oscillation of said shaft in either of its extreme positions of reciprocation engages the speeds of said transmission, means associated with the upper end of said shaft for reciprocating and rotating said shaft, a pin extending transversely through said shaft, a spring anchor member loosely fitted over the lower end of said shaft, which anchor abuts said bracket, and a tension spring having one end hooked over said pin and having a convolution intermediate of its other end which is hooked over said anchor member with the spring tensioned, to thereby resiliently urge said shaft to one position of reciprocation at all times, the end of said spring having said convolution being of such length that said spring may be supported thereby while being hooked over said pin.

5. A gearshift mechanism comprising, a shaft rotatably and reciprocally mounted upon the steering column of a motor vehicle in substantial axial alignment therewith, means associated with the lower end of said shaft which upon oscillation of the shaft at the end of its reciprocal stroke selectively engages a particular gear train in the vehicle transmission, a sleeve extending laterally from the upper portion of said shaft, a shift lever for operating said shaft, said lever having an enlarged intermediate portion disposed within said sleeve and in substantial alignment with the outer end of said sleeve, said enlarged intermediate portion having an opening therethrough, smaller openings in the outer end of said sleeve in alignment with said shift lever openings, a pair of detents disposed within the opening in said shift lever, said detents having reduced end portions which project into the smaller openings in said sleeve, and a compression spring disposed between said detents so that when said shift lever is inserted into said sleeve, said detents will be urged outwardly into said sleeve openings and thereby pivotally support said shift lever in said sleeve, for the purpose described.

JOHN J. WHARAM.